United States Patent [19]
Taniyama et al.

[11] Patent Number: 4,778,434
[45] Date of Patent: Oct. 18, 1988

[54] SLIDE-TYPE CONSTANT VELOCITY UNIVERSAL JOINT

[75] Inventors: Kiyoshi Taniyama, Toyota; Nobuhiko Okano, Okazaki, both of Japan

[73] Assignee: Toyota Jidosha Kabushiki Kaisha, Toyota, Japan

[21] Appl. No.: 33,799

[22] Filed: Apr. 3, 1987

[30] Foreign Application Priority Data

Apr. 29, 1986 [JP] Japan .................. 99543

[51] Int. Cl.[4] ............................ F16D 3/20
[52] U.S. Cl. .................. 464/111; 464/167; 464/905
[58] Field of Search ............ 464/8, 111, 120, 122, 464/123, 124, 167, 905

[56] References Cited

U.S. PATENT DOCUMENTS

| | | | |
|---|---|---|---|
| 1,508,653 | 9/1924 | Flick | 464/124 |
| 4,224,806 | 9/1980 | Kobayashi | 464/111 |
| 4,371,356 | 2/1983 | Dore | 464/111 |
| 4,580,995 | 4/1986 | Orain | 464/111 |
| 4,582,502 | 4/1986 | Girguis | 464/111 |
| 4,619,628 | 10/1986 | Orain | 464/111 |

FOREIGN PATENT DOCUMENTS

| | | |
|---|---|---|
| 43-20810. | 9/1943 | Japan . |
| 56-47413 | 11/1981 | Japan . |
| 57-13211 | 3/1982 | Japan . |
| 59-23864 | 7/1984 | Japan . |

Primary Examiner—Daniel P. Stodola
Attorney, Agent, or Firm—Oblon, Fisher, Spivak, McClelland, & Maier

[57] ABSTRACT

A slide-type constant velocity universal joint has an inner shaft member having trunnions rotatably and axially slidably carrying rollers respectively received in axial guide grooves formed in an outer shaft member. Each guide groove accommodates a pair of inner groove members each axially slidably disposed between one of the side faces of the guide groove and an associated roller and providing a cylindrical inner groove in line contact with a spherical outer surface of the roller. A roller bearing or a low-friction layer is disposed between each inner groove member and an associated side face of an associated guide groove. In another embodiment, a single inner groove member is disposed in each guide groove and has a pair of side wall portions each disposed between a roller and an associated side face of the guide groove.

5 Claims, 3 Drawing Sheets

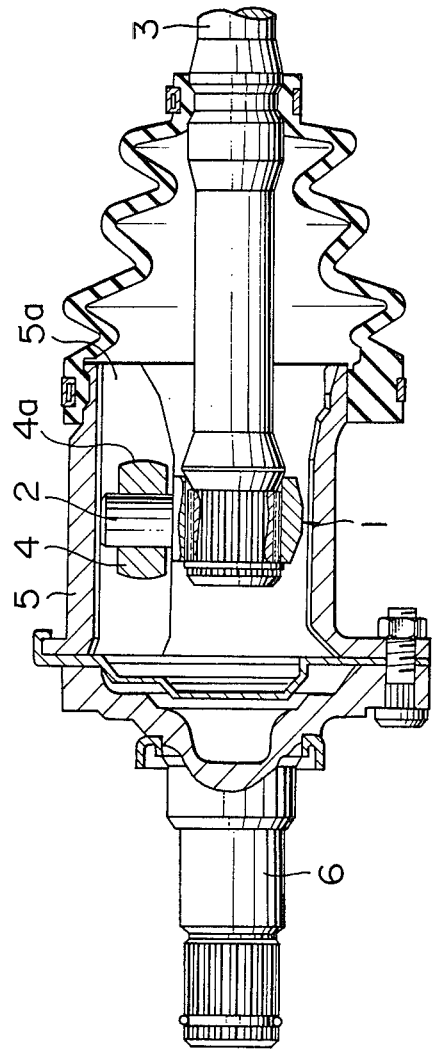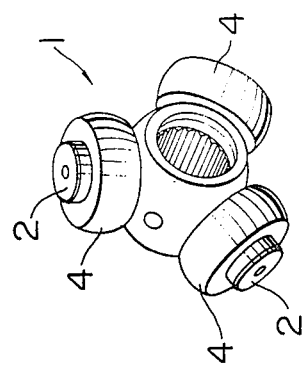
FIG. 5 PRIOR ART
FIG. 6 PRIOR ART

SLIDE-TYPE CONSTANT VELOCITY UNIVERSAL JOINT

BACKGROUND OF THE INVENTION

The present invention relates to a slide-type constant velocity universal joint such as a tripod-type constant velocity universal joint which finds its major use in automotive drive shaft systems.

Constant velocity universal joint of tripod type has been broadly used in drive shaft systems of vehicles and, particularly, drive shaft systems of automobiles of front-engine and front-wheel drive type.

This type of constant velocity universal joint is known for its reduced friction resistance of sliding parts during its operation, as disclosed in, for example, Japanese Post-Examination Patent Publication No. 20810/1968, but is still unsatisfactory in the following points:

Namely, as will be explained in detail later with reference to the drawings, this type of constant velocity universal joint, when used in the drive shaft system of an automobile, causes lateral vibration of the body of the automobile in the frequency region near the resonant frequency of the body, particularly when it operates under a comparatively large accelerating torque with a large joint angle formed between both axes of the shafts thereof. More particularly, the vibration becomes serious when the joint angle exceeds a range of from 3.5 to 4.5 degrees. For this reason, it has been necessary to design the automobile such that the joint angle formed between both shafts of the joint does not exceed 4.0 degrees during its operation. This undesirably limits the degree of freedom in design.

In order to overcome this problem, a tripod type constant velocity universal joint has been proposed in which a needle roller bearing and a pair of guide rings which make spherical surface contact with each other are disposed between each trunnion and a roller mounted thereon, as disclosed, for example, in Japanese Post-Examination Patent Publication Nos. 47413/1981 and 13211/1982 and Japanese Post-Examination Utility Model Publication No. 23864/1984. This tripod type constant velocity universal joint, however, is still unsatisfactory.

SUMMARY OF THE INVENTION

Accordingly, an object of the present invention is to provide a slide-type constant velocity universal joint which can overcome the above-described problems of the prior art.

The slide-type constant velocity universal joint according to the present invention comprises an inner shaft member having a plurality of trunnions extending radially outwardly therefrom, rollers each mounted on one of the trunnions for rotation and axial sliding movement relative to the trunnion and having a substantially spherical outer surface, and an outer shaft member shaped to provide outer guide grooves extending in the axial direction of the outer shaft member and receiving the rollers, respectively. Each of the outer guide grooves has a pair of parallel outer guide faces extending axially of the outer shaft member. An inner groove means is disposed in one of the outer guide grooves and provides inner guide grooves of a substantially semi-cylindrical cross-section disposed in line contact with the spherical outer surface of an associated roller. Each guide groove means further provides a pair of outer side faces disposed in opposed relationship to the outer guide faces of an associated outer guide groove. Each inner groove means is movable relative to the outer guide faces of an associated outer guide groove. A low-friction means is disposed between each of the outer side faces of each inner groove means and an associated outer side face of an associated outer guide groove.

The above and other objects, features and advantages of the invention will become clear from the following description of the preferred embodiments with reference to the accompanying drawings.

BRIEF DESCRIPTION OF THE DRAWINGS

FIG. 5 is an axial sectional view of the prior art slide-type constant velocity universal joint; and FIG. 6 is a perspective view of a tripod subassembly incorporated in the prior art universal joint shown in FIG. 5.

DESCRIPTION OF THE PREFERRED EMBODIMENTS

Figure 1:
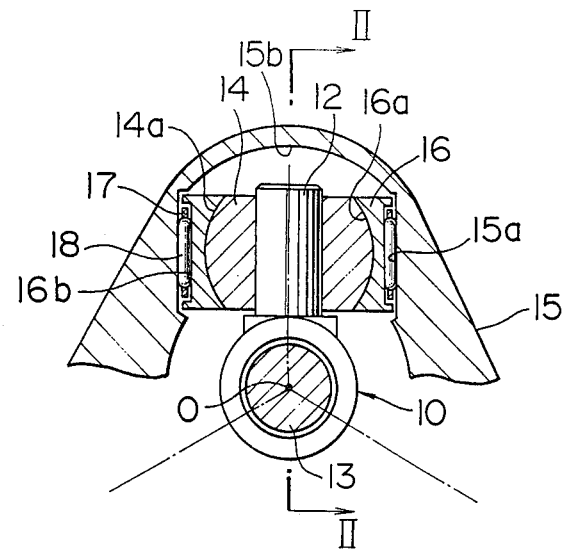
FIG. 1 is a sectional view of an essential portion of a first embodiment of the slide-type constant velocity universal joint in accordance with the present invention.

Before the preferred embodiments are described, a typical conventional slide-type constant velocity universal joint and the problems encountered by this universal joint will be explained in detail with specific reference to FIGS. 5 and 6.

Referring to these Figures, a shaft 3 as an inner shaft member of the universal joint is integrally fixed to a tripod 1 which is provided with three trunnions 2 projecting radially outwardly therefrom. Each trunnion 2 rotatably and axially-slidably carries a roller 4 having an outer surface 4a which is a part of a sphere. The universal joint further has a tulip member 5 having a peripheral wall having an inner peripheral surface which defines three axially extending semicylindrical guide grooves 5a which extend in parallel with the axis of a shaft 6 coupled to the tulip member 5 and receive the spherical rollers 4, respectively.

In operation, torque is transmitted from the shaft 6 to the shaft 3 through the tulip member 5, the rollers 4, the trunnions 2 and the tripod 1 and vice versa. Any axial relative movement between the shaft 3 and the tulip member 5 is absorbed by the rolling of the rollers 4 along the associated semi-cylindrical guide grooves 5a.

When the tripod-type constant velocity universal joint operates under a load torque and with a joint angle formed between the shaft 3 and the shaft 6, since the rollers 4 are always constrained in the respective semi-cylindrical guide grooves 5a which extend in parallel with the axis of the tulip member 5, the distance between the center of each roller 4 and the axis of the tripod is cyclically changed. This cyclic change in the distance is absorbed by the sliding motion of each roller 4 along the surface of the associated trunnion 2 in the axial direction of the trunnion. The sliding movement of each roller 4 on the trunnion encounters a resistance particularly when a high level of load torque is applied to the universal joint. This resistance appears as a rotational tertiary forcible vibratory force which acts in the direction of the axis of the tulip member 5.

The level of the rotational tertiary forcible vibratory force is increased as the joint angle is increased. More specifically, when this joint is applied to an automotive drive shaft system, a lateral vibration of the automobile body in the frequency region near the resonant frequency of the automobile body is caused by the rotational tertiary forcible vibratory force particularly when a large torque is applied to the universal joint for accelerating the automobile at a joint angle of more than 3.5 to particularly 4.0 degrees. Therefore, when a tripod-type universal joint is incorporated in the drive shaft system of a vehicle, the vehicle had to be designed such that the joint angle formed between both shafts of this universal joint does not exceed 4.0 degrees. This undesirably limits the degree of freedom in the design of the automobile.

This problem can be overcome by using a slide-type constant velocity universal joint of the present invention, as will be understood from the following description of preferred embodiments.

A first embodiment of the slide-type constant velocity universal joint of the present invention will be described with reference to FIGS. 1 and 2.

Referring to these Figures, the tripod-type constant velocity universal joint has a tripod 10 which is provided with three trunnions 12 which are integrally formed on the outer peripheral surface thereof so as to project radially outwardly with their axes extending radially at an angular intervals of 120° about the axis 0 of the tripod 10. The tripod 10 has a bore into which is fixed a shaft 13 which constitutes an inner shaft member. Thus, the shaft 13 and the tripod 10 are connected to each other such that torque can be transmitted from the shaft 13 to the tripod 10 and vice versa. Each trunnion 12 rotatably and axially slidably carries a roller 15 having an outer spherical surface 14a.

The tripod-type constant velocity universal joint of this embodiment further has a tulip member 14 which constitutes the outer shaft member of the universal joint. The tulip member 15 has three guide grooves 15b which are arranged at angular intervals of 120 degrees about the axis of the tulip member 15 and extend axially of the tulip member to receive respective rollers 14 carried by the trunnions on the tripod 10.

Figure 2:
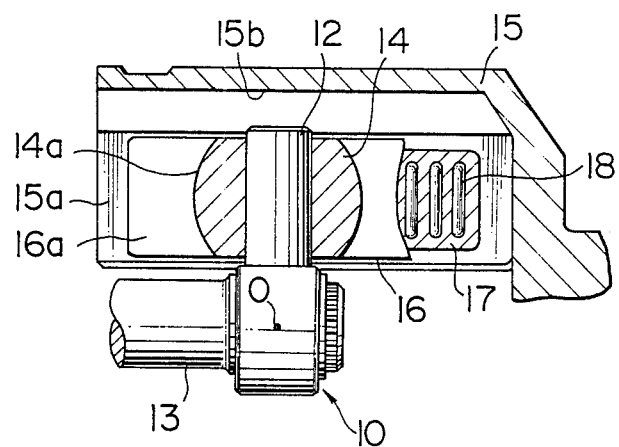
FIG. 2 is a sectional view taken along the line II—II in FIG. 1.

As will be seen in FIG. 1, the opposing side faces of each guide groove 15b are grooved to provide a pair of planar outer guide faces 15a which extend axially of the tulip member 15 in parallel and opposed relationship with each other to define therebetween an axially extending channel in which a pair of inner groove members 16 are disposed for sliding movement axially of the tulip member 15 along the outer guide faces 15a. For this purpose, each inner groove member 16 has an axial dimension shorter than the axial dimension of an associated outer guide face 15a so that the inner groove member 16 is movable relative to the outer guide face 15a axially of the tulip member 15.

Each inner groove member 16 has a generally semi-cylindrical inner guide groove 16a extending in the axial direction of the tulip member 15 and being adapted to make a line contact with the outer surface of the associated roller 14. In other words, the roller 14 is disposed in rolling engagement with the inner surface of the inner guide groove 16a. Each inner groove member further has a substantially planar outer side face 16b disposed in opposed relationship to an associated outer guide face 15a. Between the outer side face 16b of each inner groove member 16 and the associated outer guide face 15a is disposed a low-friction means which, in the illustrated embodiment, is a needle roller bearing having a plurality of needle rollers 18 arranged in the longitudinal direction of the outer guide face 15a and each extending transversely thereof so that the needle rollers 18 can roll on the outer guide face 15a as well as on the outer side face 16b of the inner groove member 16. The needle rollers 18 are rotatably held by a cage 17.

In operation, any change in the relative position between the shaft 13 and the tulip member 15 in the axial direction is absorbed partly by rolling of the rollers 14 along the semi-cylindrical inner guide grooves 16a of the inner groove member 16 and partly by the sliding motion of the inner groove members 16 with respect to the associated outer guide faces 15a. The rolling of the rollers 14 along the semi-cylindrical inner guide grooves 16a does not encounter substantial resistance because the rollers 14 are rotatable on the respective trunnions 12. The sliding of the inner groove members 16 with respect to and along the outer guide faces 15a also does not encounter substantial resistance because a smooth sliding motion is ensured by the presence of the needle roller bearings therebetween. Thus, the shaft 13 and the tulip member 15 can move relative to each other in the axial direction with a very small resistance.

When the tripod-type constant velocity universal joint rotates under a load torque while a certain joint angle is formed between the axes of the shaft 13 and the tulip member 15, a forcible vibratory force is generated due to the friction between the trunnions 12 and the associated rollers 14 and acts in the axial direction of the tulip member 15. In the described embodiment of the universal joint according to the present invention, however, a significant part of this vibratory force is absorbed by smooth sliding movements of the inner groove members 16 relative to the tulip member 15 which movements are facilitated by very low friction therebetween due to the presence of the needle rollers 18 therebetween.

In consequence, only a very small part of the forcible vibrator force is transmitted to the outside of the universal joint. It is thus possible to remarkably reduce the lateral vibration of the body of an automobile having a drive shaft system incorporating the described tripod-type constant velocity universal joint. The reduced axial forcible vibration force also enables bearings which support the universal joint to stand a longer use, i.e., the reliability of the bearings is improved. Furthermore, the limitation in the joint angle of the universal joint is eliminated to increase the degree of freedom in the design of the automobile. For instance, it becomes possible to mount the engine at a higher position so as to increase the road clearance of the automobile, thereby reducing any risk of interference between the road surface and the lowest portion of the automobile such as a transfer case.

Figure 3:
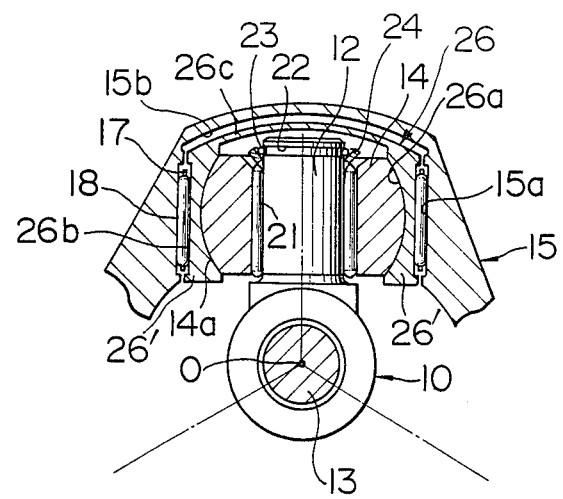
FIG. 3 is a sectional view of an essential portion of a second embodiment of the slide type constant velocity universal joint in accordance with the present invention.

FIG. 3 shows a second embodiment of the slide-type constant velocity universal joint in accordance with the present invention. In this Figure, the same reference numerals are used to denote the same parts or members as those appearing in FIG. 1 and detailed description of such parts or members is omitted.

The second embodiment is different from the first embodiment in that a needle roller bearing 21 is disposed between each trunnion 12 and the associated roller 14 and in that a single inner groove member 26 is employed to provide a pair of inner guide grooves. More specifically, the single inner groove member 26 has two parallel side wall portions 26' each having a semicylindrical inner guide groove 26a and a planar outer side face 26 as in the case of the inner groove member 16 of the preceding embodiment of the invention. The two side wall portions of the inner groove member 26 are connected together by an integral outer peripheral wall or bridge portion 26c having a configuration generally conforming to the inner surface of the radially outer part of the guide groove 15b, thus completing the inner groove member 26. Each trunnion 12 is provided with an annular groove 22 in which a snap ring 23 is engaged to retain a retainer 24 which in turn prevents the roller 14 and the needle roller bearing 21 from being dislodged from the trunnion 12.

This embodiment is advantageous in that a smooth rotation of each roller on the associated trunnion 12 is ensured by virtue of the needle roller bearing 21 and that employment of the single inner groove member 26 in each guide groove 15b simplifies the steps of the manufacture of the universal joint.

Figure 4:
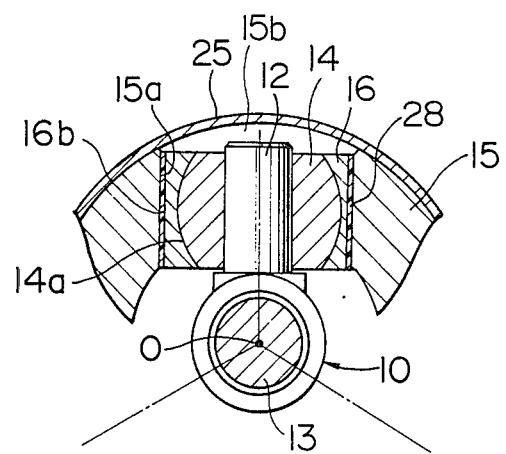
FIG. 4 is a sectional view of an essential portion of a third embodiment of the slide-type constant velocity universal joint in accordance with the present invention.

A third embodiment of the invention is shown in FIG. 4 in which the same reference numerals are used to denote the same parts or members as those appearing in FIG. 1 to eliminate repetition of description of the same parts or members.

In the third embodiment, the outer guide grooves 15b have their radially outer ends opened in the outer peripheral surface of the tulip member 15. Layers 28 of a low-friction material such as Teflon (trade mark) are formed on the planar outer side faces 16b of the respective inner groove members 16. The low-friction layers 28 may alternatively be formed on the planar outer guide faces 15a of the outer guide groove 15b formed in the tulip member 15. The tulip member 15 is surrounded by an outer cover member 25 fixed to the outer peripheral surface of the tulip member 15 by press work to close the open outer ends of the outer guide grooves 15b.

It will be apparent that this third embodiment provides advantages similar to those obtainable from the preceding embodiments.

As will be understood from the foregoing description, the slide-type constant velocity universal joint of the present invention offers various advantages. First of all, it is to be noted that most part of the axial forcible vibratory force which is produced due to friction between the trunnions and the rollers when the universal joint operates under a load torque and at a large joint angle between both shafts of the joint can conveniently be absorbed within the universal joint so that minimized vibratory force is transmitted externally of the universal joint.

The reduced vibratory force correspondingly reduces the undesirable lateral vibration of the body of an automobile having a drive shaft system incorporating a universal joint of the kind described. In addition, the reduced level of the vibratory force enables the bearings supporting the universal joint to stand a longer use, thus improving the reliability of such bearings. Furthermore, any limitation of the joint angle is eliminated, so that the degree of freedom in automotive design is increased to enable the automobile to have a greater road clearance, thus eliminating the risk of interference between the automobile and the road surface.

Although preferred embodiments have been described, it is to be understood that the present invention is not limited to the described and illustrated embodiments and various changes and modifications may be made to the described and illustrated embodiments of the invention. For instance, each of the outer guide faces 15a of the tulip member 15 can be of a cross-sectional shape other than being planar as illustrated. It is also to be understood that the universal joint of the invention can have its trunnions formed integrally with a shaft which constitutes the inner shaft member of the universal joint. Further changes and modifications are possible without departing from the scope of the invention which is defined solely by the appended claims.

What is claimed is:

1. A slide-type constant velocity universal joint comprising:
an inner shaft member having a plurality of trunnions extending radially outwardly therefrom;
rollers each mounted on one of said trunnions for rotation about and sliding movement along an axis of the trunnion and having a substantially spherical outer surface;
an outer shaft member shaped to provide outer guide grooves extending in the axial direction of said outer shaft member and receiving said rollers, respectively, each of said outer guide grooves having a pair of parallel outer guide faces extending axially of said outer shaft member;
a plurality of inner groove means each disposed in one of said outer guide grooves for axial movement relative to said inner and outer shaft members and providing a pair of inner guide grooves each having a substantially semi-cylindrical cross-section and disposed in line-contact with the spherical outer surface of an associated roller, each of said inner groove means further providing a pair of outer side faces disposed in opposed relationship to the outer guide faces of an associated outer guide groove; each of said inner groove means being movable relative to the outer guide faces of an associated outer guide groove; a needle roller bearing disposed between each of the outer side faces of each inner groove means and an associated outer guide face of an associated outer guide groove; said inner shaft member and said trunnions forming a tripod; and an additional needle bearing disposed between each of said trunnions and an associated roller.

2. A slide-type constant velocity universal joint according to claim 1, wherein each of said inner groove means comprises a pair of inner groove members each disposed between one of said outer guide faces of one of said outer guide grooves and the spherical outer surface of an associated roller.

3. A slide type constant velocity universal joint according to claim 1 wherein each of said inner groove means comprises a single inner groove member including a pair of side wall portions each disposed between one of said outer guide faces of one of said outer guide grooves and the spherical outer surface of an associated roller, said single inner groove member further including a bridge interconnecting said side wall portions together and disposed in a radially outer end portion of an associated outer guide groove.

4. A slide type constant velocity universal joint according to claim 1, wherein said outer shaft member has its inner peripheral surface shaped to provide said outer guide grooves.

5. A slide-type constant velocity universal joint according to claim 1, wherein said outer shaft member is shaped such that said outer guide grooves have their radially outer ends open in an outer peripheral surface of said outer shaft member and wherein said outer shaft member is surrounded by an outer cover member fixed to the outer peripheral surface of said outer shaft member to close the radially outer ends of said outer guide grooves.

* * * * *